(12) United States Patent
Chen et al.

(10) Patent No.: US 10,275,329 B2
(45) Date of Patent: Apr. 30, 2019

(54) FAULT ISOLATION AND IDENTIFICATION IN VERSIONED MICROSERVICES

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 232 days.

(21) Appl. No.: 15/428,525

(22) Filed: Feb. 9, 2017

(65) Prior Publication Data

US 2018/0225182 A1    Aug. 9, 2018

(51) Int. Cl.
  G06F 11/16    (2006.01)
  G06F 11/20    (2006.01)
  G06F 11/14    (2006.01)

(52) U.S. Cl.
  CPC ...... *G06F 11/2038* (2013.01); *G06F 11/1487* (2013.01); *G06F 11/1629* (2013.01)

(58) Field of Classification Search
  CPC ............ G06F 11/1629; G06F 11/1609; G06F 11/1637; G06F 11/1641; G06F 11/1487
  See application file for complete search history.

(56) References Cited

U.S. PATENT DOCUMENTS

| | | | |
|---|---|---|---|
| 9,015,702 B2* | 4/2015 | Bhat | G06F 9/44552 717/140 |
| 9,262,127 B2 | 2/2016 | Patrick | |
| 9,363,301 B2 | 6/2016 | Lawson et al. | |
| 9,467,476 B1 | 10/2016 | Shieh et al. | |
| 10,108,534 B2* | 10/2018 | Vyas | G06F 9/455 |
| 2009/0069906 A1* | 3/2009 | Norberg | G05B 19/0426 700/81 |

(Continued)

FOREIGN PATENT DOCUMENTS

| | | |
|---|---|---|
| CN | 105550130 A | 5/2016 |
| WO | 2016/180433 A1 | 11/2016 |

OTHER PUBLICATIONS

Christensen, Ben, Fault Tolerance in a High Volume, Distributed System, Feb. 29, 2012 (8 pages) Link: http://techblog.netflix.com/2012/02/fault-tolerance-in-high-volume.html.

(Continued)

*Primary Examiner* — Yolanda L Wilson
(74) *Attorney, Agent, or Firm* — K&L Gates LLP (57) ABSTRACT

A method for identifying and isolating faults in versioned microservices includes a request replicator receiving an original request, and determining whether to replicate the original request. The request replicator replicates the original request creating one or more replicated requests, including a first replicated request. In an example, the request replicator dispatches the original request to a stable production system, and dispatches the first replicated request to a first modified production system. The stable production system produces a first reply to the original request. The first modified production system produces a second reply to the first replicated request. A fault detector performs a comparison of the second reply and the first reply and determines, based on the comparison, that the first modified production system has a verification status. Then, the stable production system is replaced with first modified production system.

20 Claims, 6 Drawing Sheets

(56) References Cited

U.S. PATENT DOCUMENTS

| | | | |
|---|---|---|---|
| 2009/0113413 A1* | 4/2009 | Reinz | G16H 40/40 |
| | | | 717/173 |
| 2009/0204952 A1* | 8/2009 | Naccache | G06F 11/0715 |
| | | | 717/131 |
| 2015/0205698 A1* | 7/2015 | Kaufleitner | G06F 11/3612 |
| | | | 714/38.1 |
| 2016/0269425 A1 | 9/2016 | Shieh et al. | |
| 2016/0321224 A1* | 11/2016 | Duncker | G06T 11/206 |
| 2017/0222921 A1* | 8/2017 | Li | H04L 1/22 |
| 2017/0242784 A1* | 8/2017 | Heorhiadi | H04L 41/5038 |
| 2018/0088925 A1* | 3/2018 | Emeis | G06F 8/65 |
| 2018/0109387 A1* | 4/2018 | Vyas | H04L 9/3247 |
| 2018/0314514 A1* | 11/2018 | Garg | H04L 41/5038 |

OTHER PUBLICATIONS

Aggarwal, Arpit, Microservices fault and latency tolerance using Netflix Hystrix, Jun. 12, 2016 (7 pages) Link: https://aggarwalarpit.wordpress.com/2016/06/12/microservices-fault-and-latency-tolerance-using-netflix-hystrix/.

Ask HN: How do you version control your microservices?, Hacker News (11 pages) Link: https://news.ycombinator.com/item?id=9705098.

Micro services—Versioning strategies, May 21, 2016 (4 pages) Link: http://niels.nu/blog/2016/microservice-versioning.html.

Richardson, Chris, Microservices: Decomposing Applications for Deployability and Scalability, May 25, 2014 (32 pages) Link: https://www.infoq.com/articles/microservices-intro.

* cited by examiner

FAULT ISOLATION AND IDENTIFICATION IN VERSIONED MICROSERVICES

BACKGROUND

A container may be a virtualized object similar to a virtual machine except that, typically, a container may not implement a guest operating system and may, for example, instead utilize a host operating system of a physical machine. One or more applications and/or utilities may execute in a container. A container may have one or more respective, filesystems, memory, devices, network ports, etc. for accessing the physical resources of the physical machine and other resources outside of the physical machine. Specific requests to access physical resources inside or outside of the physical machine may be made through the host operating system.

In computer systems, containers are typically used for creating hosting environments for running application programs. Computer systems may use containers to separate various components of a computing system. For example, different components of a computing system may be executed at different containers. Kubernetes®, which is an open-source system, may be used for automating deployment, scaling, and management of containerized applications.

A microservice may refer to an application with a single function or service, such as making an online payment or routing network traffic. Microservices may be used to develop an application having independently deployable services. In a typical example, a microservice is run in a container. Running microservices in containers may be helpful for developing and deploying large applications, such as enterprise solutions.

SUMMARY

The present disclosure provides new and innovative methods and systems for fault isolation identification in versioned microservices. An example method includes a request replicator receiving an original request, and determining whether to replicate the original request. In an example, the request replicator replicates the original request creating one or more replicated requests, including a first replicated request. The request replicator dispatches the original request to a stable production system, and dispatches the first replicated request to a first modified production system. The stable production system includes a first plurality of microservices running on a validated set of container images. The first modified production system includes a second plurality of microservices running on an unvalidated set of container images.

The method also includes the stable production system producing a first reply to the original request. The first modified production system produces a second reply to the first replicated request. The method also includes a fault detector performing a comparison of the second reply and the first reply, and determining that based on the comparison the first modified production system has a verification status. The method also includes replacing the stable production system with the first modified production system.

An example system includes one or more processors, a stable production system, a first modified production system, a request replicator, and a fault detector. The stable production system includes a first plurality of microservices running on a validated set of container images. The first modified production system includes a second plurality of microservices running on an unvalidated set of container images.

The one or more processors are configured, when executed, to receive, at the request replicator, an original request and determine, by the request replicator, whether the original request should be replicated. The request replicator replicates the original request creating one or more replicated requests, including a first replicated request. The request replicator dispatches the original request to the stable production system, and dispatches the first replicated request to the first modified production system. The stable production system produces a first reply to the original request. The first modified production system produces a second reply to the first replicated request. The fault detector performs a comparison of the second reply and the first reply, and determines based on the comparison that the first modified production system has a verification status. The one or more processors are also configured to replace the stable production system with the first modified production system.

Additional features and advantages of the disclosed methods and system are described in, and will be apparent from, the following Detailed Description and the Figures.

DETAILED DESCRIPTION OF EXAMPLE EMBODIMENTS

Described herein are methods and systems for identifying and isolating faults in versioned microservices. Microservice architecture typically consists of multiple tiers of running containers. Each container image can be independently replicated, upgraded, or downgraded with desired performance or reliability objectives. However, developing a continuous integration ("CI") environment with consistently changing container images is difficult. Each container image is provided by a different source and is therefore typically independently modified. When modified container images are incorporated into an existing production system it is difficult to know whether the modified containers are compatible with the production system. Further, as the CI environment is consistently changing, and the container images are continuously updated, it becomes increasingly difficult to isolate the problem as time passes.

The following example of an online shopping website shows these problems. An online shopping website, WebMart, has a set of container images/features it currently uses. It has a search feature, a checkout feature, and a product-display feature. The owners of Web-Mart would like to create a faster interface for their users. They decide to upgrade their checkout, product-display, and search features by upgrading the appropriate microservices with new versions of container images. Prior to upgrading the microservices, each updated container image may be tested in a test environment to confirm that the test system indicates the new versions work as expected. However, after upgrading all container images independently, the website experiences performance degradation and erroneous content. As seen in the example above, there may not be a practicable way to guarantee that upgraded container images will work well once actually integrated with each production system.

Aspects of the present disclosure may address the above noted deficiency by isolating and identifying faults in versioned microservices. This is done by enabling different container image versions to run in parallel with the original production system, compare their behaviors, and identify which versions of container images are faulty without sacrificing overall system stability. For example, Web-Mart would maintain its original production system to continue responding to user requests until other upgraded container images are tested/validated. To validate the upgraded container images, user requests may be replicated and sent to various modified production systems that are running concurrently with the original production system as beta production systems. Responses from these modified production systems would be compared to the response from the original production system. The modified production systems can be used to test/validate various combinations of upgraded container images in real time. Accordingly, the presently disclosed system enables the owners of Web-Mart to find the best combination of container images that produce the most desired result.

Figure 1:
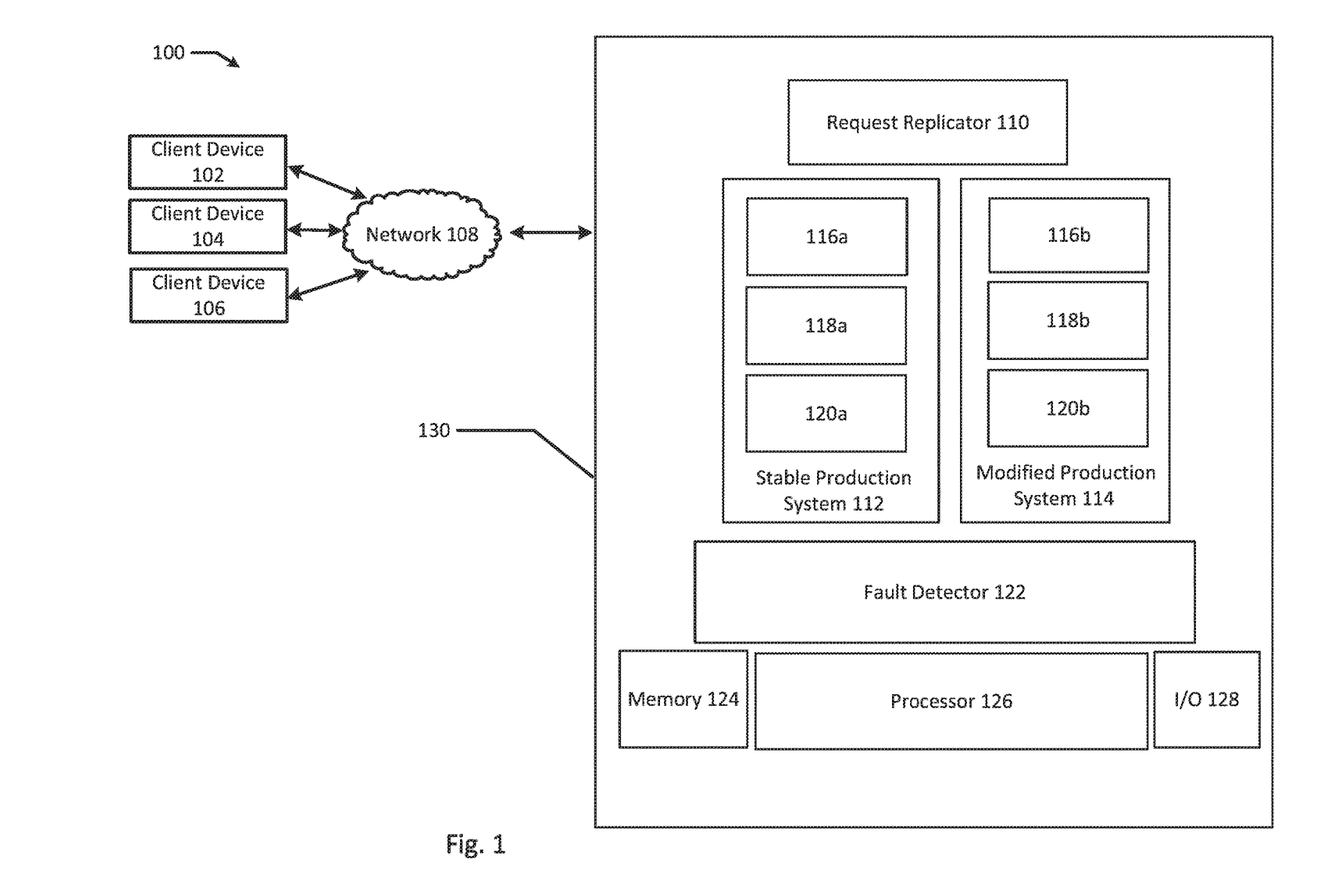
FIG. 1 is a block diagram of an example system according to an example of the present disclosure.

FIG. 1 depicts a high-level component diagram of an example system 100 for different availability and performance requirements. The system 100 may include one or more client devices 102, 104, and 106. The system 100 may include a fault detection system 130. The fault detection system 130 may include a request replicator 110, a stable production system 112, and one or more modified production systems, including modified production system 114. The stable production system 112 may include one or more validated container images 116a, 118a, and 120a. The modified production system 114 may include one or more unvalidated container images 116b, 118b, and 120b. The fault detection system 130 may also include a fault detector 122.

In an example, the one or more client devices 102, 104, and 106 may communicate with the fault detection system 130 via a network 108. The network 108 may be a public network (e.g., the Internet), a private network (e.g., a local area network (LAN) or wide area network (WAN)), or a combination thereof.

The fault detection system 130 may also include one or more physical processors communicatively coupled to memory devices. For example, the fault detection system 130 has a processor(s) 126 communicatively coupled to a memory 124. The fault detector 122, the stable production system 112, the modified production system 114, and the request replicator 110 may execute on the processor(s) 126. As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the fault detection system 130, or any other places within the system 100. In an example, all of the disclosed methods and procedures described herein can be implemented by the one or more processors. Further, the fault detection system 130 may be distributed over multiple processors, memories, and networks.

The fault detection system 130 may also include an input/output devices (e.g., a network device, a network interface controller (NIC), a network adapter, any other component that connects a computer to a computer network, a peripheral component interconnect (PCI) device, storage devices, sound or video adaptors, photo/video cameras, printer devices, keyboards, displays, etc.), for example the I/O 128, coupled to the processor.

Figure 2:
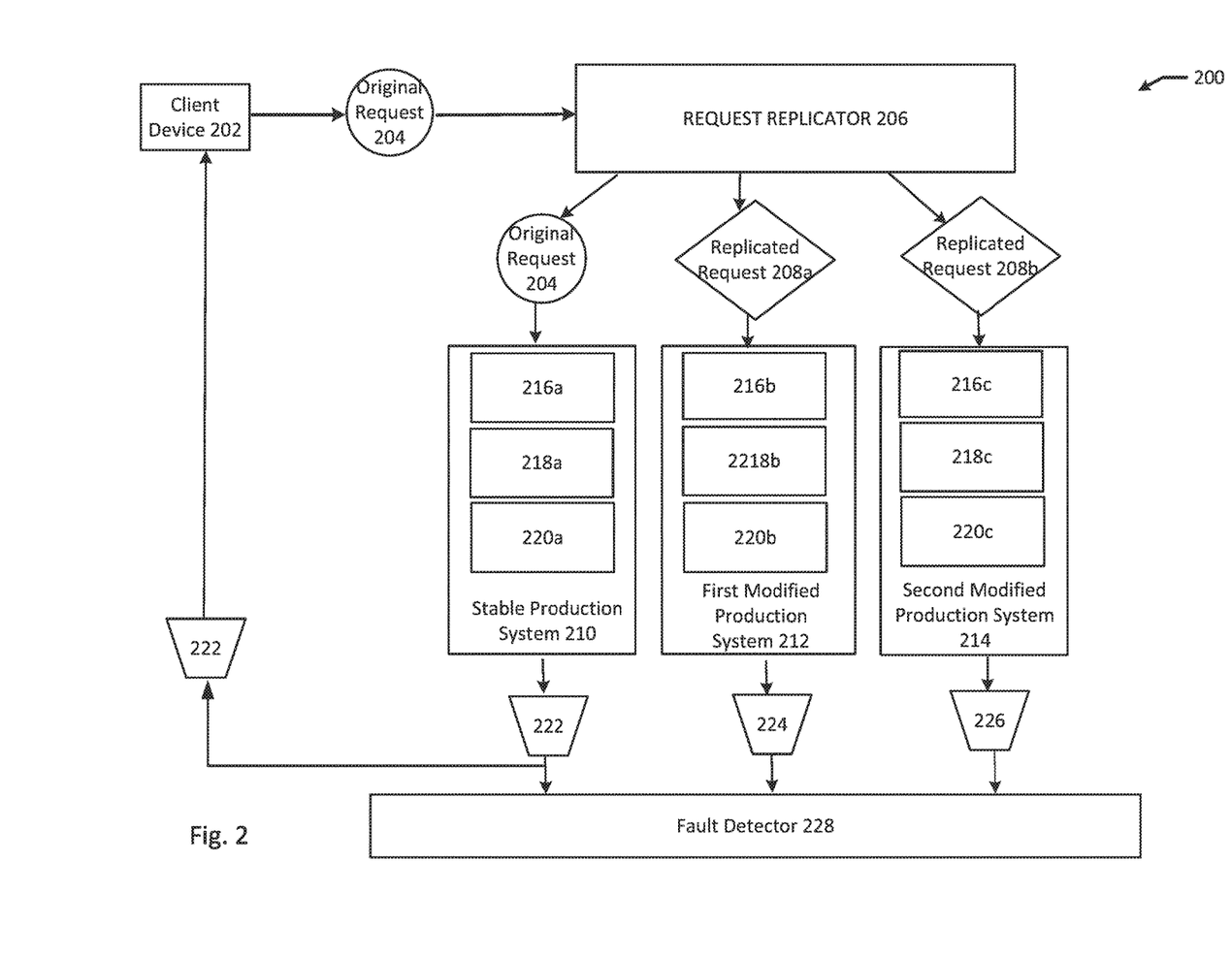
FIG. 2 is a block diagram of an example system according to an example of the present disclosure.

FIG. 2 illustrates a block diagram of a system 200 according to an example of the present disclosure. The system 200 may include a client device 202. The client device 202 could be, for example, a smart phone, tablet, desktop, laptop, television, etc. The client device 202 may send a user request, for example original request 204, to a request replicator 206. Then, the request replicator 206 determines whether to replicate the original request 204.

If the request replicator 206 determines the original request 204 is acceptable for replication, the request replicator 206 replicates the original request 204 into one or more replicated requests 208a and 208b. The request replicator 206 sends the original request 204 to a stable production system 210. The stable production system 210 contains microservices running on a set of validated container images 216a, 218a, and 220a which are known to provide correct results. The request replicator 206 sends the replicated requests 208a and 208b to one or more modified production systems, including a first modified production system 212 and a second modified production system 214. A modified production system includes microservices running on an unvalidated set of container images (216b, 218b, 220b), which are a modified version of the validated container images (216a, 218a, 220a) in the stable production system 210. For example, the first modified production system 212 contains a set of unvalidated container images 216b, 218b, and 220b. Similarly, the second modified production system 214 contains a set of unvalidated container images 216c, 218c, and 220c.

In an example, the request replicator 206 may determine that the original request 204 should not be replicated. In that case, the request replicator 206 sends the original request 204 to the stable production system 210 without replicating the original request 204.

The stable production system 210 may receive the original request 204. The stable production system 210 produces a first reply 222 in response to the original request 204. The first reply 222 is communicated to the client device 202 in response to the original request 204. Further, the first reply 222 is sent to a fault detector 228.

The first modified production system 212 produces a second reply 224. However, the second reply 224 is only communicated to the fault detector 228. Similarly, the second modified production system 214 produces a third reply 226. The third reply 226 is only communicated to the fault detector 228. Accordingly, any errors in the results of the third reply 226 or the second reply 224 will not be received by the client device 202.

The fault detector 228 receives the first reply 222, the second reply 224, and the third reply 226. The fault detector 228 then compares the second reply 224 and the third reply 226 to the first reply 222 to detect any faults. For example, if the second reply 224 or the third reply 226 includes different results than those in the first reply 222, the fault detector 228 determines that the reply from the first modified production system 212 or the second modified production system 214 is incorrect, thereby identifying a fault.

Figure 3:
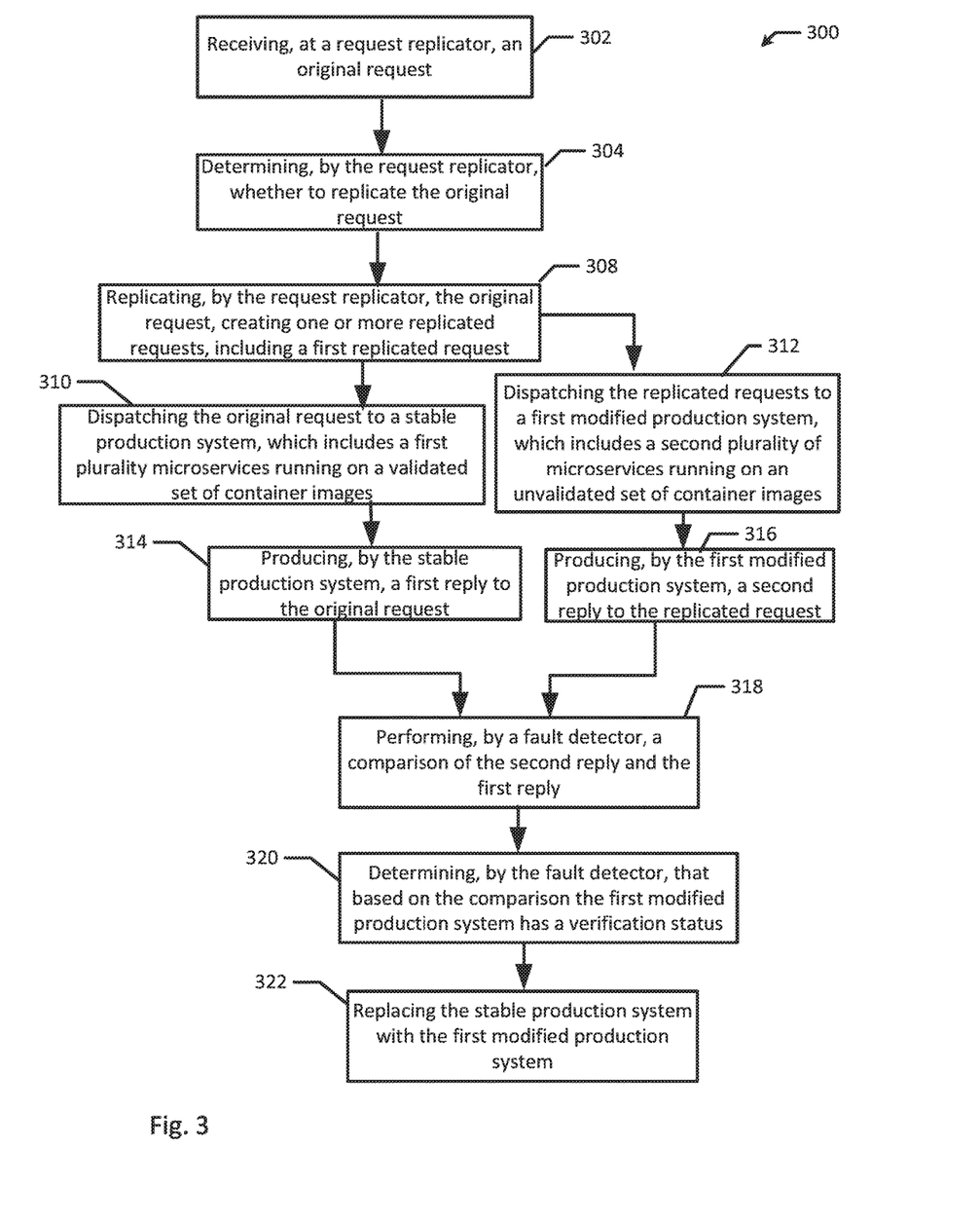
FIG. 3 is a flowchart illustrating an example method of operating a system for identifying and isolating faults in versioned microservices according to an example of the present disclosure.

FIG. 3 shows a flowchart of an example method of operating the system 200 according to an example of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

The illustrated example 300 begins with a request replicator receiving an original request (block 302). For example, a client device 202 sends an original request 204 to the fault detection system 130 for production system 112, and a request replicator 206 intercepts the original request 204. The client device 202 may be a laptop, and the original request 204 may be requesting to watch a television show. Then, the request replicator determines whether to replicate the original request (block 304). For example, the request replicator 206 may receive criteria from an administrator indicating what types of requests may be replicated. The criteria may be based off of client device type, client age, content being requested, etc. The request replicator 206 determines if the original request 204 is the type of request that should be replicated. If the request replicator determines the request should be replicated, the request replicator replicates the original request, creating one or more replicated requests, including a first replicated request (block 308). For example, request replicator 206 replicates original request 204, creating replicated request 208a and 208b. In another example, the request replicator may include one or more privacy features where the request replicator may not replicate requests that include private or sensitive information. For example, the request replicator may include logic circuitry that prevents the replication of an original request, and the communication of that original request over a network or to third parties, including bank information or social security numbers.

Then, the request replicator dispatches the original request to a stable production system, where the stable production system includes a first plurality of microservices running on a validated set of container images (block 310). Then, the request replicator dispatches the first replicated request to a first modified production system, where the first modified production system includes a second plurality of microservices running on an unvalidated set of container images (block 312). For example, the request replicator 206 dispatches the original request 204 to the stable production system 210, and dispatches the replicated request 208a to the first modified production system 212. In another example, the request replicator 206 may also dispatch the replicated request 208b to the second modified production system 214.

The first modified production system 212 is running in parallel and processing requests in real time with the stable production system 210. Therefore, the first modified production system 212 is tested under real life conditions regarding the number of client requests, timing of requests, types of requests, etc.

Then, the stable production system produces a first reply to the original request (block 314). Then, the first modified production system produces a second reply to the first replicated request (block 316). For example, the stable production system 210 produces a first reply 222. Also, the first modified production system 212 produces a second reply 224. If the original request 204 is a user requests to watch a television show, the original request 204 is sent to the stable production system 210 which outputs a first reply 222. Replicated request 208a, which may be identical to original request 204, is sent to the first modified production system 212. The first modified production system 212 outputs a second reply 224 in response to replicated request 208a.

Then, the fault detector performs a comparison of the second reply and the first reply (block 318). For example, fault detector 228 receives the first reply 222 and the second reply 224. The fault detector 228 compares the second reply 224 against the first reply 222. Then, the fault detector determines that based on the comparison the first modified production system has a verification status (block 320). For example, the fault detector 228 may determine the verification status of the second reply 224 as either positive or negative. A positive verification status may indicate that replies from modified productions systems are of a higher quality than the reply from the stable production system. A negative verification status may indicate that the replies are as good as, or worse than, the reply of the stable productions system. The criteria used to determine the verification status of a modified reply may be set by an administrator. An administrator may require the replies from the modified production systems be identical to replies from the stable production system in order to receive a positive verification status. Alternatively, an administrator may require the replies from the modified production system to be within a certain threshold of time or accuracy to receive a positive verification status. For example, an administrator may require that the fault detector 228 give the second reply 224 a positive verification status only if content within the second reply 224 is within 95% accuracy (95% of the content in the second reply 224 is the same as the content in the first reply 222). In another example, an administrator may require that the fault detector 228 receive the second reply 224 no later than one second after the first reply 222 is received by the fault detector 228 in order to receive a positive verification status. This verification status may be reported to an administrator, or elsewhere, when determining whether to replace a stable production system with a modified production system.

For example, an original request 204 may be a request to watch a television show. The fault detector 228 may receive a first reply 222 and a second reply 224. An administrator determines a desirable reply is for the client device to receive the correct show in response to its original request 204, and for the client device to receive the show at least five seconds faster than the stable production system 210 can produce the first reply 222. The first modified production system 212 produces second reply 224. Second reply 224 includes the wrong show, but outputs a reply ten seconds faster than the stable production system 210 produces first reply 222. Therefore, fault detector 228 may give second reply 224 a negative verifications status. In another example, the first modified production system 212 produces reply 224 which includes the correct show, and outputs the reply 224 ten seconds faster than the stable production system 210 produces first reply 222. Therefore, reply 224 may receive a positive verification status by fault detector 228.

Further, the verification status need not be in terms of a positive or negative. The verification status may also be embodied as a ranking, a score, in numerals, in letters, in binary, etc.

Finally, the first modified production system replaces the stable production system (block 322). For example, if fault detector 228 gives second reply 224 a positive verification status, indicating that first modified production system 212 has better performance characteristics than stable production system 210, then first modified productions system 212 may replace stable production system 210.

Figure 4:
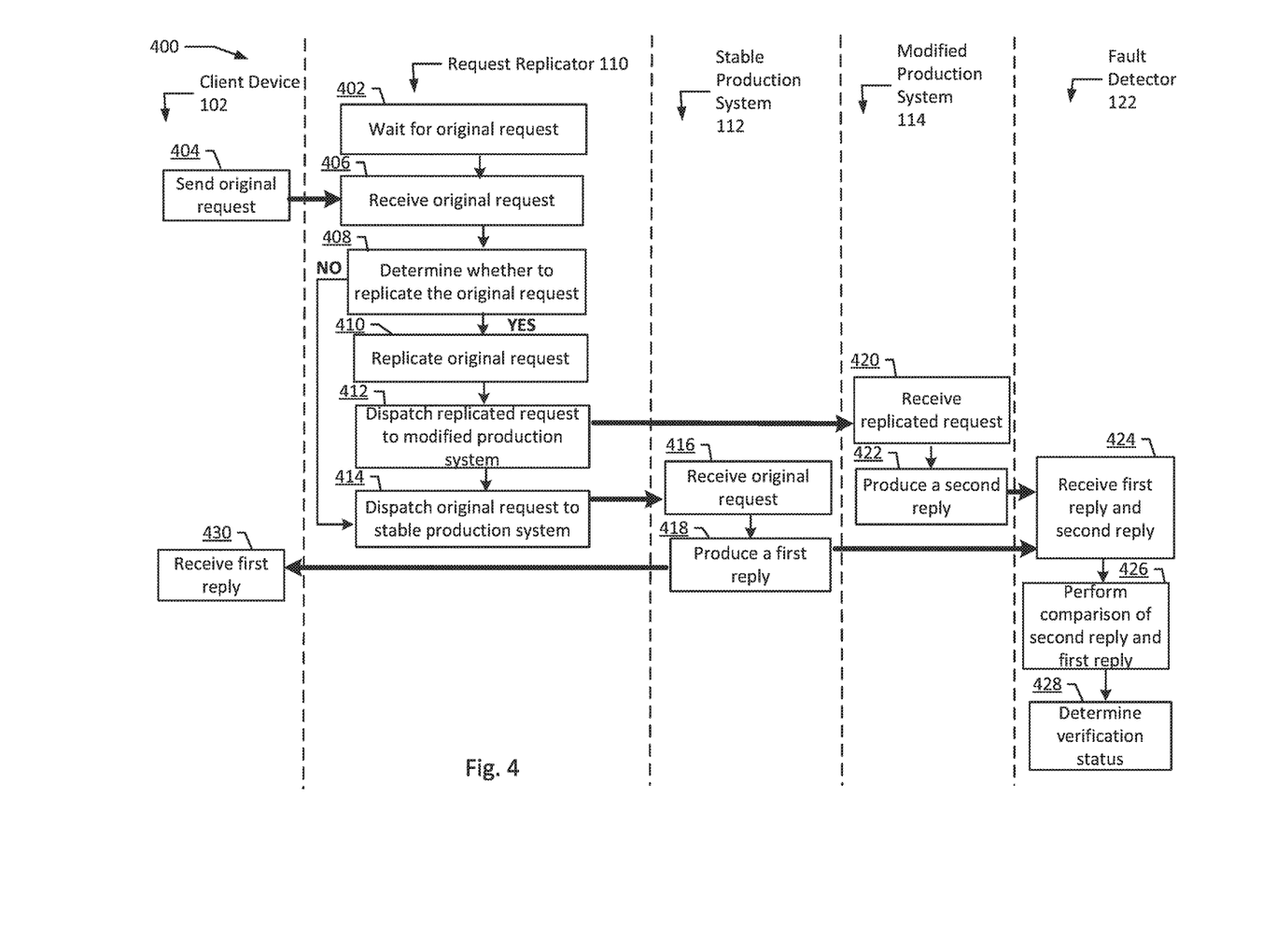
FIGS. 4 is a flow diagram illustrating example methods of operating a system for identifying and isolating faults in versioned microservices according to an example of the present disclosure.

FIG. 4 shows a flowchart of an example method 400 for a system for identifying and isolating faults in versioned microservices. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including a request replicator 110, a stable production system 112, a modified production system 114, fault detector 122, and client device 102.

In the illustrated example, the request replicator 110 waits for an original request (block 402). The client device 102 sends the original request to the request replicator 110 (block 404). Then, the request replicator 110 receives the original request (block 406). The request replicator 110 determines whether to replicate the original request (block 408). If the request replicator 110 determines to replicate the original request, the original request is replicated (block 410). Then, the request replicator 110 dispatches the replicated request to the modified production system 114 (block 412). In an example, the request replicator 110 simultaneously dispatches the original request to the stable production system 112 (block 414). In another example, the request replicator 110 shortly before or shortly after dispatches the original request to the stable production system 112.

Further, at block 408, the request replicator 110 may determine not to replicate the original request. For example, if the original request includes confidential user information, the request replicator 110 may determine not to replicate the original request. In that case, jump to block 414.

Then, the stable production system 112 receives the original request from the request replicator 110 (block 416). Then, the stable production system 112 produces a first reply in response to the original request (block 418). The first reply is sent to the client device 102 in response to the original request, where the client device 102 receives the first reply (block 430). The first reply is also sent to the fault detector 122, where fault detector 122 receives the first reply (block 424). Simultaneously, the modified production system 114 receives the replicated request from the request replicator 110 (block 420). Then, the modified production system 114 produces a second reply in response to the replicated request (block 422). The second reply is sent to the fault detector 122, and the fault detector 122 receives the second reply (block 424).

After receiving the first reply and the second reply, the fault detector 122 performs a comparison of the second reply and the first reply (block 426). Then, the fault detector 122 determines the verification status of the second reply (block 428).

For example, the original request is a request from a client device 102 to watch a show. The stable production system 112 produces a first reply which grants the user access to view the show. However, the modified production system 114 produces a second reply that requires the user to input a username and password. Both replies are sent to the fault detector 122. The fault detector 122 performs a comparison, and gives the second reply a negative verification status. In another example, the second reply grants the user access to view the show, but the modified production system 114 takes twice as long to output the second reply. The first reply and the second reply are sent to the fault detector 122. The fault detector 122 performs a comparison of the first reply and the second reply, and gives the second reply a negative verification status.

If there is more than one modified production system, and both modified production systems have a positive verification status, meaning both have better performance characteristics than stable production system 112, an administrator may determine, or the fault detector may be programmed to determine, which modified production system performs the most desirably. The one that performs the best may replace the stable production system 112.

Figure 5:
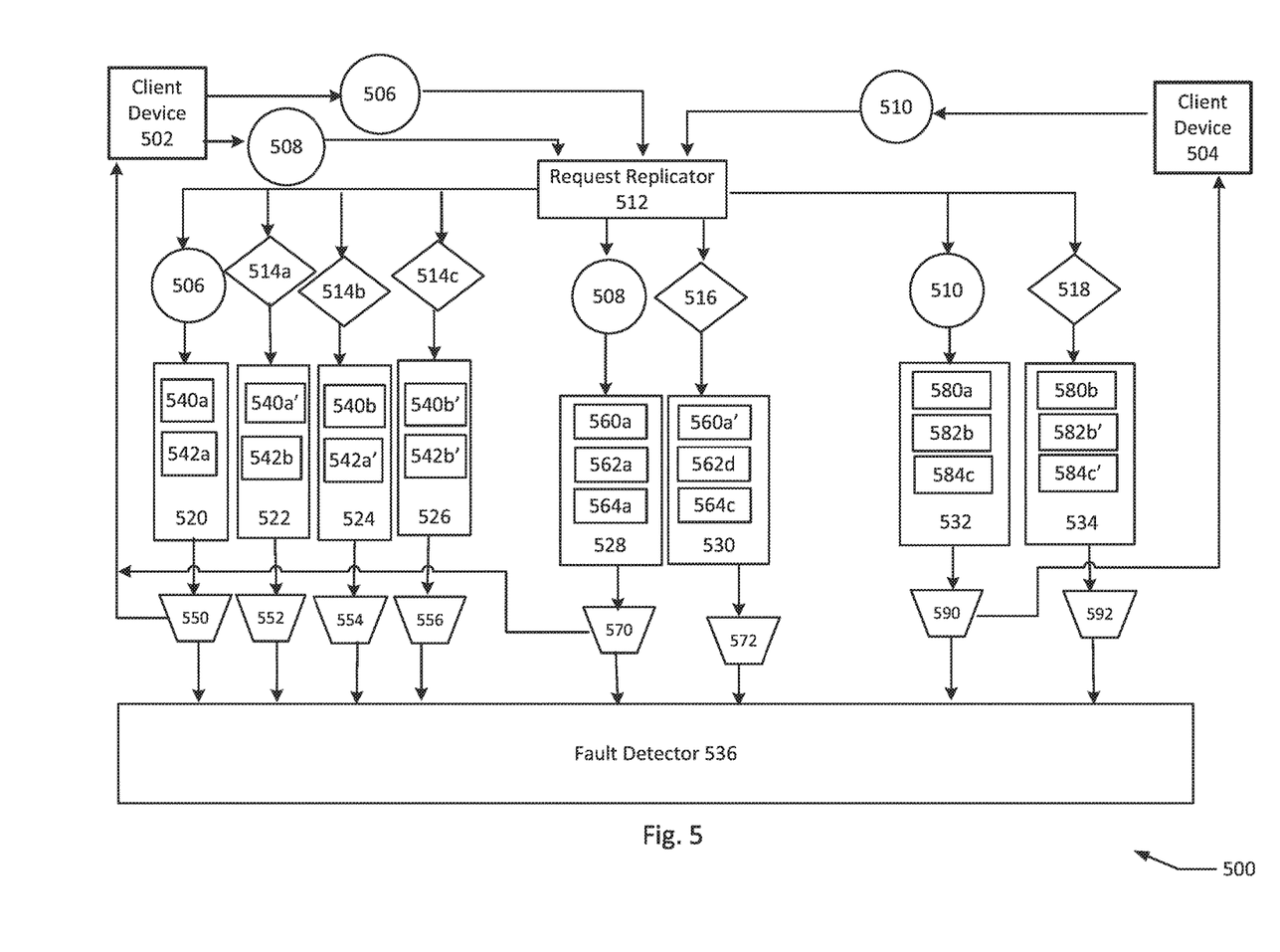
FIG. 5 is a block diagram of an example system according to an example of the present disclosure.

FIG. 5 is a block diagram of an example system according to an example of the present disclosure. As illustrated in FIG. 5, an example system 500 may include client devices 502 and 504. The client device 502 is transmitting an original request 506 and an original request 508 to a request replicator 512. The client device 504 is transmitting an original request 510 to the request replicator 512. For example, the client device 502 may be transmitting the original request 506 to play music, and the original request 508 to view an image. The client device 504 may be transmitting the original request 510 to use a help/support function. The original requests 506, 508, and 510 are sent to, or intercepted by, the request replicator 512. If the request replicator 512 determines the original requests 506, 508, and 510 should be replicated, the original requests 506, 508, and 510 are replicated creating replicated requests 514, 514*b*, and 514*c* corresponding to the original request 506, replicated request 516 corresponding to the original request 508, and the replicated request 518 corresponding to the original request 510.

As can be seen in FIG. 5, each original request is sent to a different stable production system. For example, the original request 506 is sent to a stable production system 520, the original request 508 is sent to a stable production system 528, and the original request 510 is sent to a stable production system 532. Further, the replicated requests are sent to the corresponding modified production systems. For example, the replicated requests 514*a*, 514*b*, 514*c* are sent to a first modified production system 522, a second modified production system 524, and a third modified production system 526. The replicated request 516 is sent to a first modified production system 530. The replicated request 518 is sent to a first modified production system 534. The number of modified production systems may be correlated to the number unverified container images, or to the number of sets or combinations of unverified container images. Although there is no specific limit on the number of modified production systems that may exist, it may be preferable to limit the number of container images having different versions from the stable production system to about 5, and the number of different versions of each container image to about 3. This means that, in a preferable example, the number of modified production systems would be limited to 60 based on the combinations of five container images with three different versions. However, it is possible to have more or less than 60 modified production systems.

FIG. 5 depicts various example combinations of container images can be included in the productions system. For example, the stable production system 528 holds the first version of container 560, 562, and 564. This is indicated by the stable production system 528 containing 560a, 562a, and 564a. However, the first modified production system 530 still holds the first version of container 560a', but contains the fourth version of container 562, indicated as 562d. Further, the first modified production system 530 contains the third version of container 564, indicated as 564c.

Further, for example the stable production system 520 holds container images 540a and 542a. The first modified production system 522 holds container image 540a' and 542b. The second modified production system 524 holds container image 540b and 542a'. The third modified production system 526 holds container image 540b' and 542b'. Further, the stable production system 532 holds containers 580a, 582b, and 584c. The first modified production system 534 holds containers 580b, 582b', and 584c'.

A modified production system may include a partial unvalidated set of container images or a complete unvalidated set of container images. For example, the first modified production system 522 contains a partial unvalidated set of container images (540a' and 542b). This is because the first modified production system 522 contains a first quantity of container images that are unmodified and a second quantity of container images that are modified. The first modified production system 522 contains an unmodified and identical container image to one that is in stable production system 520 (540a' is an identical copy of 540a). The first modified production system 522 also contains a modified container image (542b is a modified version of 542a). Therefore, the first modified production system 522 contains a partial unvalidated set of container images because some of the container images are identical to those included in the stable production system 520, but not all. Similarly, the first modified production system 530 and the first modified production system 534 contain a partial unvalidated set of container images.

Further, the third modified production system 526 contains a complete unvalidated set of container images (540b' and 542b'). This is because all the container images in the third modified production system 526 are modified versions of those container images in the stable production system 520.

The stable production system 520 produces a first reply 550. The first reply 550 is communicated to the client device 502 and to the fault detector 536. The modified production systems 522, 524, and 526 produce subsequent replies 552, 554, and 556 respectively. The subsequent replies 552, 554, and 556 are sent to the fault detector 536.

The stable production system 528 produces a first reply 570. The first reply 570 is communicated to the client device 502 and to the fault detector 536. The first modified production system 530 produces a second reply 572. The second reply 572 is sent to the fault detector 536. The stable production system 532 produces a first reply 590. The first reply 590 is communicated to the client device 504 and to the fault detector 536. The first modified production system 534 produces a second reply 592. The second reply 592 is sent to the fault detector 536.

Further, the request replicator 512 may receive many subsequent original requests, creating subsequent replicated requests. In another example, the request replicator 512 may subsequently receive another original request from the client device 502. If the request replicator 512 determines the subsequent original request should be replicated, the request replicator 512 then replicates the subsequent original request creating a second replicated request. Similarly, the request replicator 512 may receive further subsequent requests, causing the request replicator 512 to create a third, fourth, or fifth replicated request. There may be an unlimited number of original requests received by the request replicator 512, therefore there may also be an unlimited number of replicated requests created by the request replicator 512.

Further, the request replicator 512 need not always send a replicated request to each of first modified production system 522, second modified production system 524, and third modified production system 526. The request replicator 512 may send replicated requests to various combinations of the modified production system. For example, request replicator 512 may send a replicated request to only third modified production system 526. In another example, request replicator 512 may send a replicated request to both the first modified production system 522 and second modified production system 524, but not to third modified production system 526.

Figure 6:
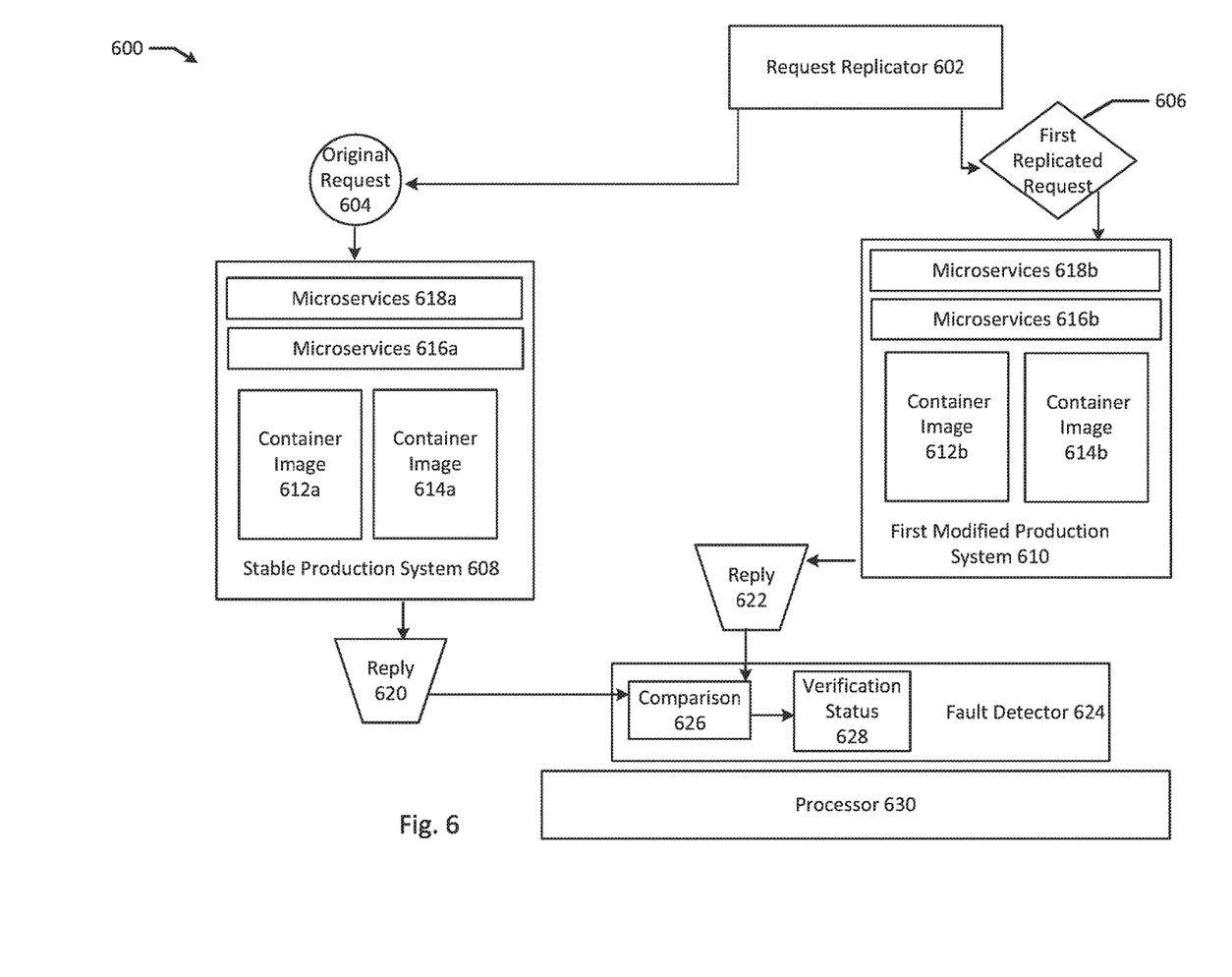
FIG. 6 is a block diagram of an example system according to an example of the present disclosure.

FIG. 6 is a block diagram of an example system according to an example of the present disclosure. As illustrated in FIG. 6, an example system 600 may include one or more processors 630, a stable production system 608, a first modified production system 610, a request replicator 602, and a fault detector 624. The request replicator 602 dispatches an original request 604 to the stable production system 608 and dispatches a first replicated request 606 to the first modified production system 610. The stable production system 608 includes a first plurality of microservices 616a and 618a, and a validated set of container images 612a and 614a.

The first modified production system 610 includes a second plurality of microservices 618b and 616b, and an unvalidated set of container images 612b and 614b. The stable production system 608 produces a first reply 620. The first modified production system 610 produces second reply 622. The first reply 620 and second reply 622 are sent to the fault detector 624, where a comparison 626 is conducted. The fault detector 624, based on the comparison 626, produces a verification status 628.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A microservice fault isolation method comprising:
receiving, at a request replicator, an original request;
determining, by the request replicator, whether to replicate the original request;
replicating, by the request replicator, the original request, creating one or more replicated requests, including a first replicated request;
dispatching the original request to a stable production system, wherein the stable production system includes a first plurality of microservices running on a validated set of container images;
dispatching the first replicated request to a first modified production system, wherein the first modified production system includes a second plurality of microservices running on an unvalidated set of container images;
producing, by the stable production system, a first reply to the original request;
producing, by the first modified production system, a second reply to the first replicated request;
performing, by a fault detector, a comparison of the second reply and the first reply;
determining, by the fault detector, that based on the comparison the first modified production system has a verification status; and
replacing the stable production system with the first modified production system.

2. The microservice fault isolation method of claim 1, wherein the verification status indicates that the second reply is identical to the first reply.

3. The microservice fault isolation method of claim 1, wherein an allowed threshold of accuracy is determined by an administrator, and
wherein the verification status indicates whether the second reply is within the allowed threshold of accuracy from the first reply.

4. The microservice fault isolation method of claim 1, wherein an allowed threshold of time is determined by an administrator, and
wherein the verification status indicates whether the second reply is received within the allowed threshold of time after the first reply.

5. The microservice fault isolation method of claim 1, further comprising:
dispatching a second replicated request to a second modified production system, wherein the second modified production system runs on a complete unvalidated set of container images; and
dispatching a third replicated request to a third modified production system, wherein the third modified production system runs on a partial unvalidated set of container images.

6. The microservice fault isolation method of claim 5, further comprising:
producing, by the second modified production system, a third reply to the second replicated request; and
producing, by the third modified production system, a fourth reply to the third replicated request.

7. The microservice fault isolation method of claim 6, further comprising:
performing, by the fault detector, a comparison of the third reply to the first reply; and
performing, by the fault detector, a comparison of the fourth reply to the first reply.

8. The microservice fault isolation method of claim 1, further comprising:
sending, by a client device, the original request to the request replicator.

9. The microservice fault isolation method of claim 8, further comprising:
communicating, by the stable production system, the first reply back to the client device in response to the original request.

10. The microservice fault isolation method of claim 1, wherein a first quantity of modified production systems is determined by a second quantity of unvalidated container images that are identified as requiring verification.

11. The microservice fault isolation method of claim 1, further comprising:
reporting, by the fault detector, the verification status to an administrator.

12. The microservice fault isolation method of claim 1, further comprising:
processing, by the stable production system and the first modified production system, the original request and the first replicated request, respectively, in real time.

13. The microservice fault isolation method of claim 1, wherein the original request is a web-browser request.

14. The microservice fault isolation method of claim 1, wherein the original request is a web-application request.

15. The microservice fault isolation method of claim 1, further comprising:
determining, by the request replicator, to replicate the original request based on privacy information in the original request.

16. The microservice fault isolation method of claim 1, further comprising:
selecting, by the request replicator, which original requests to replicate.

17. The microservice fault isolation method of claim 1, further comprising:
   determining, by the request replicator, to replicate the original request based on privacy information in the original request; and
   selecting, by the request replicator, which original requests to replicate.

18. A system comprising:
   one or more processors;
   a stable production system that includes a first plurality of microservices running on a validated set of container images;
   a first modified production system that includes a second plurality of microservices running on an unvalidated set of container images;
   a request replicator; and
   a fault detector,
   wherein the one or more processors, when executed:
   receive, at the request replicator, an original request,
   determine, by the request replicator, whether to replicate the original request,
   replicate, by the request replicator, the original request, creating one or more replicated requests, including a first replicated request,
   dispatch the original request to the stable production system,
   dispatch the first replicated request to the first modified production system,
   produce, by the stable production system, a first reply to the original request,
   produce, by the first modified production system, a second reply to the first replicated request,
   perform, by the fault detector, a comparison of the second reply and the first reply,
   determine, by the fault detector, that based on the comparison the first modified production system has a verification status, and
   replace the stable production system with the first modified production system.

19. The system of claim 18, further comprising:
   a second modified production system; and
   a third modified production system.

20. A non-transitory machine readable medium storing instructions, which when executed by one or more physical processors, cause the one or more physical processors to:
   receive, at a request replicator, an original request;
   determine, by the request replicator, whether to replicate the original request;
   replicate, by the request replicator, the original request, creating one or more replicated requests, including a first replicated request;
   dispatch the original request to a stable production system;
   dispatch the first replicated request to a first modified production system;
   produce, by the stable production system, a first reply to the original request;
   produce, by the first modified production system, a second reply to the first replicated request;
   perform, by a fault detector, a comparison of the second reply and the first reply;
   determine, by the fault detector, that based on the comparison the first modified production system has a verification status; and
   replace the stable production system with the first modified production system.

* * * * *